United States Patent
Pieron et al.

(10) Patent No.: US 9,975,050 B1
(45) Date of Patent: *May 22, 2018

(54) SYSTEM AND METHOD FOR PROVIDING AWARDS TO PLAYERS OF A GAME

(71) Applicant: Kabam, Inc., San Francisco, CA (US)

(72) Inventors: Luc Pieron, San Francisco, CA (US);
Thomas Baxter, Millbrae, CA (US);
Henry Rull, Concord, CA (US); Sam McLellan, San Francisco, CA (US);
Stephanie Schultz, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/688,623

(22) Filed: Aug. 28, 2017

Related U.S. Application Data

(63) Continuation of application No. 14/278,631, filed on May 15, 2014, now Pat. No. 9,744,445.

(51) Int. Cl.
*A63F 13/50* (2014.01)
*A63F 13/55* (2014.01)
*A63F 13/798* (2014.01)

(52) U.S. Cl.
CPC .......... *A63F 13/798* (2014.09); *A63F 13/50* (2014.09); *A63F 13/55* (2014.09); *A63F 2250/142* (2013.01)

(58) Field of Classification Search
None
See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |
| 5,964,660 A | 10/1999 | James |
| 6,142,472 A | 11/2000 | Kliebisch |
| 6,190,225 B1 | 2/2001 | Coleman |
| 6,190,255 B1 | 2/2001 | Thomas |
| 6,347,996 B1 | 2/2002 | Gilmore |
| 6,402,619 B1 | 6/2002 | Sato |

(Continued)

FOREIGN PATENT DOCUMENTS

| | | |
|---|---|---|
| KR | 1020130137431 | 12/2013 |
| WO | 2002026333 | 1/2002 |

(Continued)

OTHER PUBLICATIONS

Gem System—Street Fighter X Tekken, http://www.streetfighter.com/us/sfxtk/features/gem-system, printed Nov. 6, 2012, 6 pages.

(Continued)

*Primary Examiner* — Robert T Clarke, Jr.
(74) *Attorney, Agent, or Firm* — Sheppard Mullin Richter & Hampton LLP

(57) ABSTRACT

One aspect of the disclosure relates to a multi-prize mystery box that provides an award to users who activate the mystery boxes and benefits to members of affiliations associated with the activating users. Users of an association may be provided notifications informing the users that the activating user has provided them with a benefit, increasing recognition of the activating user in the game.

20 Claims, 5 Drawing Sheets

(56) References Cited

U.S. PATENT DOCUMENTS

| | | |
|---|---|---|
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,696,428 B1 | 4/2014 | Post |
| 8,715,068 B2 | 5/2014 | Arnone |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0151351 A1 | 10/2002 | Baerlocher |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0185932 A1 | 9/2004 | Lombardo |
| 2004/0215524 A1 | 10/2004 | Parkyn |
| 2004/0219969 A1 | 11/2004 | Casey |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2007/0287523 A1 | 12/2007 | Esses |
| 2008/0009344 A1 | 1/2008 | Graham |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |

(56) References Cited

U.S. PATENT DOCUMENTS

| | | |
|---|---|---|
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | van Os |
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005438 A1 | 1/2013 | Ocko |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 | 1/2013 | Suprock |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303276 A1 | 11/2013 | Weston |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0315616 A1 | 10/2014 | Avin |
| 2014/0329585 A1 | 11/2014 | Santini |
| 2014/0337259 A1 | 11/2014 | Lamb |

(56) References Cited

U.S. PATENT DOCUMENTS

| | | | |
|---|---|---|---|
| 2015/0011286 A1* | 1/2015 | Kim | G07F 17/3244 463/17 |
| 2015/0019349 A1 | 1/2015 | Milley | |
| 2015/0031440 A1 | 1/2015 | Desanti | |
| 2015/0087378 A1 | 3/2015 | Louie | |
| 2015/0306494 A1 | 10/2015 | Pieron | |
| 2015/0335995 A1 | 11/2015 | McLellan | |
| 2015/0352436 A1 | 12/2015 | Pieron | |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Profession—WoWWiki—Your guide to the World of Warcraft, URL: http://www.wowwiki.com/Profession, printed Nov. 6, 2012, 8 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-l-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clash of Clans>, 3 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550,http://lotro-wiki.com/index.php?title=Quest:A_Little_Extra_Never_—_Part_1&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, Links are to used articles, 33 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http://montoya.econ.ubc.ca/Econ522/auctions.pdf, slide 5, Para. 1.3, 19 pages.

Wiki "Gaia online", available on Sep. 9, 2011, https://web.archive.org/web/20110927210555/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island- updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, Published on Mar 14, 2009, 1 page.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

'Quest item—WoWWiki—Your guide to the World of Warcraft', printed from http://www.wowwiki.com/Quest-Item, Retrieved on Apr. 16, 2014, 1 page.

"Cataclysm Guide: Guild Advancement -Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Potentials, URL: maplestory.nexon.net/guides/game-play/systems/OOFIj [Retrieved Jun. 24, 2013], 5 pages.

Dreamslayer's Enchanting and Upgrading Guide—With Pictures:D and Explanations, URL: forums.elswordonline.com/Topic5673.aspx [Retrieved Feb. 21, 2013], 8 pages.

The Arreat Summit—Items: Basic Item Information, URL: web.archive.org/ web/20090323171356/http://classic.battle.net/diablo2exp/items/basics.shtml [Retrieved Feb. 21, 2013], 3 pages.

Elsword—Wikipedia, the free encyclopedia, URL: en.wikipedia.org/wiki/Elsword [Retrieved Feb. 21, 2013], 6 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Super Mario Bros. 3, StrategyWiki, the video game walkthrough and strategy guide, http://strategywiki.org/wiki/Super_Mario_Bros._3, Oct. 2, 2012, 4 pages.

MapleStory, Internet guide: http://maplestory.nexon.net/guides/game-play/systems/00Flk/, http://maplestory.nexon.net/guides/game-play/systems/00Flk,http://maplestory.nexon.net/guides/game-play/systems/00FFV, Sep. 28, 2012, 12 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

(56) References Cited

OTHER PUBLICATIONS

"How Town Hall to Level 4". Forum.supercell.net. Online. Jan. 31, 2013. Accessed via the Internet. Accessed Feb. 21, 2015. URL:http://forum.supercell.net/showthread.php/15052—How—Town—Hall—to—Level—4, 2 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1—14-29-Hamari,Lehdonvirta.pdf, on May 26, 2015, 16 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

MapleStory—Guides—Equipment Upgrading 101: Enhancements, URL: maplestory.nexon.net/guides/game-play/systems/OOFlk; [Retrieved Jun. 24, 2013] 3 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_—_Part_2&oldid=399366>, <http://lotrowiki.com/index.php ?title=Getting_Started&oldid=349681 >. Links are to used articles. (7 pgs.) Feb. 26, 2014.

"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO-Store&oldid=396550, http://lotro-wiki.com/index.php?title=Quest:A_Little_Extra_Never_Hurts_—_Part_1&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, Links are to used articles, 33 pages.

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1&oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.

"Getting Started" written by BoD, published on Oct. 13, 2011 and printed from URL <http://lotrowiki.com/index.php?title=Getting_Started&oldid=349681 >, 5 pages.

"Lotro Store" written by Elinnea, published on Dec. 15, 2011 and printed from URL <http://lotrowiki.com/index.php ?title=LOTRO_Store&oldid=396550>, 23 pages.

"Main Page" written by Starbusty, published on Dec. 12, 2011 and printed from URL <http://lotrowiki.com/index.php?title=Main_Page&oldid=394429>, 2 pages.

New Feature: Tiered Tournaments and Tournament Updates, printed from http://community.kabam.com/forums/showthread.php?171349-New-Feat on Feb. 11, 2014, 2 pages.

Wikipedia, Mafia Wars, <http://en.wikipedia.org/wiki/Mafia_Wars>, Jan. 28, 2012, 3 pages.

Elsword, Dec. 27, 2007, KOG Studios, guide posted Mar. 17, 2011 https ://web.arch ive.org/ web/20110509033123/http ://forums.elswordon l ine.com/Topic5673.aspx, http://en.wikipedia.org/wiki/Elsword (9 pages).

Diablo 2, Blizzard Entertainment, Mar. 23, 2009, manual and on line website http://web.archive.org/web/20090323171356/http://classic.battle.net/diablo2exp/items/basics.shtml (4 pages).

\* cited by examiner

SYSTEM AND METHOD FOR PROVIDING AWARDS TO PLAYERS OF A GAME

FIELD OF THE DISCLOSURE

This disclosure relates to providing awards to players of a game and, in particular, providing mystery boxes to players of a game, which, when activated, provide an award to the activating player and the player's fellow affiliation members.

BACKGROUND

The popularity of online games has grown over the years. Conventional online games are provided through gaming platforms, such as Facebook.com, Kabam.com, Zynga.com, Bigpoint Games, Steam, etc. Within online games and/or gaming platforms, gaming communities have developed to promote group-based game play. The gaming communities may be known as affiliations. The affiliations facilitate online game play to perform tasks within the online game, facilitate actions within the online game amongst members of the affiliation, and facilitate actions to compete against other affiliations.

Membership with an affiliation may impact retention of users within the online game. That is, users of an online game that are members of an affiliation may be more likely to spend more time and resources within an online game. Conventional affiliations within online games may be all-inclusive, accepting all users that desire membership to the affiliation, while other affiliations within an online game may be extremely exclusive. Certain affiliations grant memberships to new users based on a need for additional members or based on in-game performance metrics of users. As such, affiliations may become cliques, where membership to an affiliation is hard or impossible for new users to obtain. Additionally, joining an affiliation may seem like a daunting task to new users.

Accordingly, alternative approaches including incentives for users that are members of an affiliation may encourage affiliations to accept new members and/or encourage current members of the affiliation to remain active and/or increase their activity in the online game.

Providing players virtual items in games is known. Players of games often pick-up, purchase, obtain or win virtual items when playing games. The virtual items may or may not provide a benefit in the game. Games are known to require the purchase of some virtual items in order for the users to obtain them. Games are known to facilitate the formation of alliances, groups, or team of users within the game. Games are also known to allow some users to excel at the game, while others do not. Some users of games are known to be big spenders, as they spend relatively more money in the game than other users of the game.

SUMMARY

Marketing research shows that there exists a subset of users of games that spend relatively more on in-game purchases than do other users. Marketing research also shows that some of these high-spending users like to be able to showcase their wealth and/or status within the game. Users who are members of affiliations of users, formed of discrete groups of users, also like to be able to help their affiliations to progress. Providing a mechanism by which the high-spending users are able to: (a) showcase their wealth and/or status within the game and/or affiliation; and (b) aid their affiliation members to progress in the game and increase in status as well, will incentivize the users to spend more on in-game purchases.

One aspect of the disclosure relates to a system for providing awards to players of a game. Awards may be in the form of one or more benefits, wherein the benefits provided to users may impact gameplay. The awards may be one or more virtual items. Virtual items may include objects usable in the game space and/or virtual space. Virtual items may include virtual currency which may be used in a virtual shop associated with the game to purchase virtual items, benefits, and/or other items. The system may comprise one or more physical computer processors configured by machine-readable instructions to perform one or more functions. The machine readable instructions may be thought of conceptually as components of machine readable instructions. However, this application is intended to cover all forms of machine readable instructions whether provided in component form or otherwise. Such components may include a space component, a user component, a relationship component, a virtual shop component, a virtual container component, a distribution component, a notification component, and one or more other components.

The space component may facilitate participation by multiple users in an online game through client computing platforms associated with the users. The space component may be configured to execute an instance of the online game to facilitate presentation of the online game to the users. The space component may be configured to implement in-game actions in the instance of the online game in response to action requests for the in-game actions from the users. The space component may be configured to facilitate user participation in the online game by effectuating transmission of information related to the instance of the online game to client computing platforms on which views of the online game are presented to users. The users may include a first user and a second user.

The user component may be configured to manage one or more user profiles associated with the users. The one or more user profiles may include indications of one or more affiliations within the online game. The one or more affiliations may comprise discrete groups of users, wherein the users have a relationship having a functional significance within the online game that has an impact on game play. The one or more user profiles may include indications of inventory information for the users. For example, the profiles of users may include a first user profile for a first user having an indication that the user is associated with a first affiliation and inventory information for the first user, and a second user profile for a second user having an indication that the second user is associated with the first affiliation and inventory information for the second user. The first and second users may be associated with the same affiliation. The first and second users may have a relationship that has a functional significance impacting game play.

The relationship component may be configured to manage one or more affiliations within the online game. A given affiliation within the online game may comprise a discrete group of users with a relationship having a functional significance within the online game. The relationship having a functional significance in the online game may have an impact on game play for the users. The affiliations may include a first affiliation within a first online game among a group of users including the first user and the second user. The relationship having a functional significance may include one or more of a leadership role, a controller role, a mentorship role and/or an administrator role.

The virtual shop component may be configured to present offers to sell container instances of virtual containers. The offers may be presented through a store interface. The offers may include a first offer to sell an instance of a first virtual container at a first associated user cost. The virtual containers may be associated with sets of potential awards. The sets of potential awards may have associated secondary benefits. For example, the first virtual container may be associated with a first set of potential awards. The first set of potential awards may include a first potential award to be provided to the first user in response to activation of the first virtual container by the first user. The first set of potential awards may include an associated set of secondary benefits to be provided to members of the first affiliation associated with the first user.

The probability component may be configured to obtain sets of probabilities associated with the sets of potential awards of the virtual containers. For example, the first probability set may be obtained for the first set of potential awards of the first virtual container. The virtual container component may be configured to receive activation requests from users for the offered container instances of the virtual containers, such that a first activation request for the first virtual container is received from the first user.

The probability component may be configured to adjust the probabilities of the sets of probabilities based on past distributions of the awards to users, such that the probability associated with the first award may be adjusted based on the past distributions of the first award to the users. Adjusting the probabilities may be based on past distributions to users on a user-by-user basis or may be based on past distributions to users as a whole.

Individual awards of the sets of potential awards may have an associated perceived value within the game. The probability component may be configured to adjust individual probabilities associated with individual awards based on the perceived value of the individual awards. For example, a first probability associated with a first potential award may be adjusted based on the first perceived value of the first potential award in the game. In some implementations, the higher the perceived value of an award, the lower the probability attributed to that award. The perceived value of the award may be determined based on the abundance of items associated with the award in the game. The more abundant and easily available an item is in the game, the less perceived value that item may have. The perceived value of the award may be dependent on individual ones of the users. For example, a first user may have a particular item associated with an award, and, therefore, the perceived value of that item may be less than for a second user who does not have the particular item associated with the award.

The associated user cost of offers associated with virtual containers may be determined based on the value of the potential awards associated with the virtual containers. For example, a first virtual container may be associated a first set of potential awards and a second virtual container may be associated with a second set of potential awards. The first set of potential awards may be comprised of awards having a higher perceived value than the second set of potential awards. The user cost associated with the offer for the first virtual container may, therefore, be higher than the user cost associated with the offer for the second virtual container. It may be that not all of the awards in the first set of potential awards have a higher perceived value than do the awards in the second set of potential awards. It may be the case that just one award in the first set of potential awards is a highly sought-after and/or rare item in the game and may have a high perceived value, which may be higher than any of the awards in the second set of awards. The other awards of the first set of potential awards may have relatively low perceived values in the game compared to the awards in the second set of potential awards. Nevertheless, because the first set of potential awards includes the high value award, the user cost associated with the first virtual container may be higher than the user cost associated with the second virtual container.

The user cost associated with the virtual containers may be determined based on an indication of the relative amount of virtual currency spent and/or purchased by the user. For example, in response to an indication that the first user has spent and/purchased a relatively high amount of virtual currency in the game and/or other games, the virtual shop component may determine a higher user cost for the virtual container for the first user compared to the user cost for the virtual container for a second user who has spent and/or purchased a relatively low amount of virtual currency in the game and/or other games. An incentive to accept the offer may be provided by having a relatively lower user cost for the virtual container for users who have spent and/or purchased a relatively low amount of virtual currency in the game. Higher-spending users may not require an incentive to accept the offer, and therefore, by having a relatively high user cost to the offer for the users who have spent and/or purchased relatively more virtual currency, the income from those users may be increased.

The user cost for the virtual containers may be based on a user rank. For example, a first offer associated with a first virtual container may have a first user cost for a first user. The first offer associated with the first virtual container may have a second user cost for a second user, wherein the first user has a higher status in the game compared to the second user. Users having a higher status may have a desire to maintain that status within the game. Awards provided by the sets of potential awards associated with the first virtual container may enable and/or facilitate the first user to maintain and/or increase their status in the game relative to the second user. The first user may be more likely to accept the first offer in order to maintain and/or increase their status within the game. Conversely, the second user may not be as incentivized as the first user to maintain and/or increase their status in the game and therefore may not be as incentivized to accept the first offer, especially if the first user cost for the first user and the second user cost for the second user is the same. Having the first user cost for the first user higher than the second user cost for the second user may increase the revenue generated from the users of the game.

The virtual shop component may be configured to present offers to users who have completed a defined achievement within the game. The achievement may be set and/or selected by one or more administrators. The achievement may be the completion of a mission or a quest in game. The achievement may be the accumulation of an amount of virtual items, virtual currency, XP, might, and/or other metrics in the game.

The virtual container component may be configured to determine, using the obtained set of probabilities for the activated virtual container and responsive to the activation request, an award from the set of potential awards associated with the activated virtual container to provide to the users. For example, a first award from the first set of potential awards of the first virtual container may be determined for distribution to the first user based on the first set of probabilities.

The distribution component may be configured to distribute the award to the users, in response to determining the award provided to the users from the activated virtual container, such that in response to determining the first award from the first virtual container activated by the first user to be distributed to the users, the first award is distributed to the first user, and in response to the first award being distributed to the first user, a first benefit is provided to the users with the first affiliation, such that a benefit is provided to the second user.

The notification component may be configured to provide a notification to the members of the first affiliation indicating that the first user has activated the first virtual container and that the affiliation members have received a benefit. For example, the second user may be provided a notification having an indication that the first user has activated the first virtual container causing the second user to receive a benefit. The benefit may be associated with the first award provided to the first user. The benefit may be a randomly selected benefit from a plurality of benefits to provide to the members of the affiliation of the first user. The benefit may have a perceived value within the game. The value of the benefit relative to other ones of the plurality of benefits may be proportional to the value of the first item relative to the other ones of the plurality of items associated with the mystery box. For example, if the first user receives a relatively valuable item in response to activating the mystery box, the other members of the first affiliation may receive a relatively valuable benefit. Conversely, if the first user receives a relatively invaluable item in response to activating the mystery box, the other members of the first affiliation may receive a relatively invaluable benefit.

The benefits provided to the affiliation members may impact game play of the affiliation members, such that the affiliation members may have an advantage in the game over users who are not members of the affiliation and who do not have the benefits. Such benefits may include, but are not limited to, increased resource gathering abilities, increased resource capabilities, increased armed forces capabilities, increased purchasing power, increased discounts when purchasing in game items, decreased time between turns, upgrades and/or other time-based aspects of a game, and/or other benefits in the game. Some benefits may relate to the manner in which games are provided. Benefits may provide increased quality of service for the user when playing the game, increased server processing resources for the users, prioritized server resources for the users, and/or other priorities and/or benefits.

The awards provided to users of the game who activate the virtual containers may provide benefits to those users. The potential awards may provide one or more benefits to the users in the game, such that the first potential award provided to the first user may provide one or more first benefits to the first user in the game. The first benefit may be a virtual item having a value within the game. Such virtual items may include functional and non-functional virtual items. Functional virtual items may be used by players in the game to provide a benefit in the game otherwise not enjoyed by users. Non-functional virtual items may include indications of an award and/or achievement within the game, such as a trophy or a symbolic indication of the achievement.

The perceived value of the first benefit associated with the first award to the first user may be greater than the perceived value of the benefit provided to the affiliation members. By providing a benefit having a higher perceived value to the first user who activated the virtual container than the benefit provided to the other affiliation members, the first user maintains his/her ranking and status within the game. By providing an award with a higher perceived value to the first user compared to the benefit provided to the other users of the affiliation, such as the second user, the first user maintains and/or increases his/her status with respect to the other members of the affiliation. It has been found that, while high-spending users are attracted to the prospect of helping their fellow affiliation members, they also are attracted to maintaining or increasing their status with respect to those members. Providing a benefit to the high spend users to increase their status, while also allowing the high-spending users to provide a benefit to their fellow affiliation members, has been found to be highly attractive to the high-spending users, thereby incentivizing the users to engage further with the game and/or increase their in-game purchases.

The notification component may be configured to provide notifications to users of the game of the offers to provide virtual containers. The notifications may include an indication of one or more potential benefits provided by the sets of potential awards, such that the first user may receive a first notification of a first offer to provide a first virtual container having a first set of potential awards, wherein the first notification includes an indication of a first potential in-game benefit to the first user and a second potential in-game benefit to the second user. Users, viewing notifications, may be provided indications of the type of benefit that they may potentially receive from accepting the offer and/or activating the mystery box and may also be provided indications of the type of benefit that may potentially be received by the other members of their affiliation.

Another aspect of this disclosure relates to a method for providing awards to players of a game. The method may be performed on one or more physical computer processors. The method may comprise the steps of facilitating participation by multiple users in a game through client computing platforms associated with the users; managing one or more user profiles associated with the users, wherein the one or more user profiles include: indications of one or more affiliations within the online game comprising a discrete group of users with a relationship having a functional significance within the online game that has an impact on game play, and inventory information for the users, such that the profiles of users include a first user profile for a first user having an indication that the user is associated with a first affiliation and inventory information for the first user, and a second user profile for a second user having an indication that the second user is associated with the first affiliation and inventory information for the second user; presenting, through a store interface, offers to sell container instances of virtual containers, the offers including a first offer to sell an instance of a first virtual container at a first associated user cost, the virtual containers being associated with sets of potential awards, such that the first virtual container is associated with a first set of potential awards including a first potential award; obtaining sets of probabilities associated with the sets of potential awards of the virtual containers, such that a first probability set is obtained for the first set of potential awards of the first virtual container; receiving activation requests from users for the offered container instances of the virtual containers, such that a first activation request for the first virtual container is received from the first user; determining, using the obtained set of probabilities for the activated virtual container, and responsive to the activation request, an award from the set of potential awards associated with the activated virtual container to provide to the users, such that a first award from the first set of potential awards of the first virtual container is determined for distribution to the first user based on the first set of probabilities; and distributing the award to the users in response to determining the award to provide to the users from the activated virtual container, such that in response to determining the first award from the first virtual container activated by the first user to be distributed to the users, the first award is distributed to the first user, and in response to the first award being distributed to the first user a benefit is provided to the users associated with the first affiliation, such that the second user is provided a benefit.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
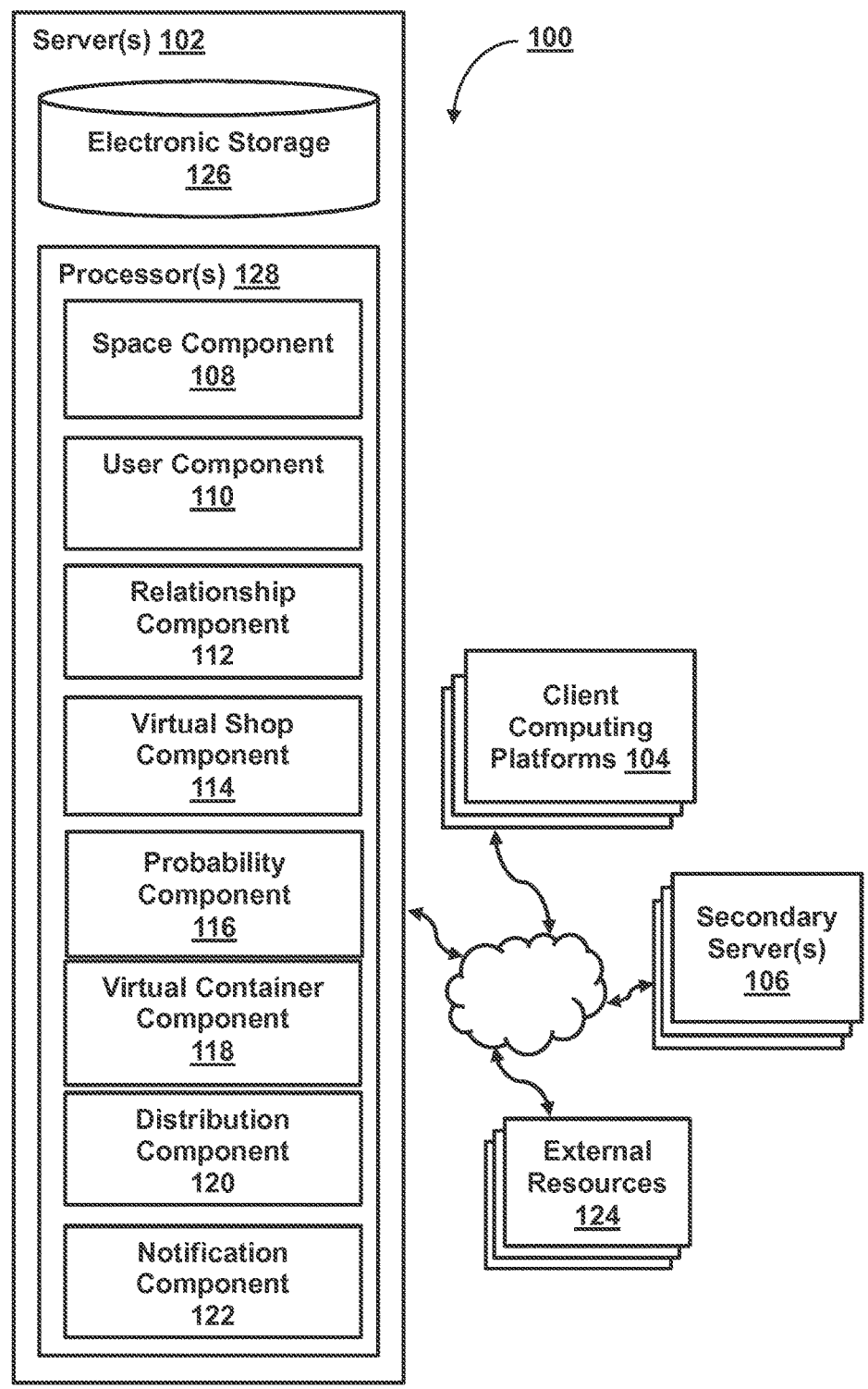
FIG. 1 illustrates a system for providing awards to players of a game, in accordance with one or more implementations.

FIG. 1 illustrates a system 100 for providing virtual items to users of a virtual space, in accordance with one or more implementations. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. In some implementations, the system may include secondary servers 106 configured to provide one or more additional functionalities to system 100. The secondary servers 106 may be configured to communicate with server(s) 102, client computing platforms 104, and/or other elements. The secondary server(s) 106 may be configured to interface with server 102 to supplement the functionality provided to the users with respect to the virtual space. For example, secondary server(s) 106 may interface with server 102 via one or more application programming interfaces.

The server 102 may include one or more computer processors 128 configured by machine-readable instructions to perform one or more functions. The machine-readable instructions may be thought of conceptually as components of machine-readable instructions. However, this application includes all forms of machine-readable instructions, whether provided in component form or otherwise. The server 102 may be configured to execute one or more computer program components. The computer program components may include one or more of a space component 108, a user component 110, a relationship component 112, a virtual shop component 114, a virtual container component 118, a probability component 116, a distribution component 120, a notification component 122, and/or other components.

The space component 108 may facilitate participation by multiple users in an online game through client computing platforms 104 associated with the users. The space component 108 may be configured to execute an instance of the online game to facilitate presentation of the online game to the users. The space component 108 may be configured to implement in-game actions in the instance of the online game in response to action requests for the in-game actions from the users. The space component 108 may be configured to facilitate user participation in the online game by effectuating transmission of information related to the instance of the online game to client computing platforms on which views of the online game are presented to users. The users may include a first user and a second user.

The space component 108 may be configured to implement the instance of the virtual space executed by the computer components to determine state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 108 is not intended to be limiting. The space component 108 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space and/or other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and/or entered by the users via their respective client computing platforms 104. Communications may be routed to and from the appropriate users through server 102 (e.g., through space component 108).

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

Interactive electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive electronic social media may include the micro-blogging service provided by Twitter™, the social network provided by Facebook™, the social network provided by MySpace™, the social network provided by Foursquare®, the virtual world provided by Second Life®, the massively multi-player online game provided by World of Warcraft®, the file sharing service provided by Flickr®, Blogger, YouTube, PlayStation® Home, Xbox® Live, and/or other interactive electronic social media.

The user component 110 may be configured to manage one or more user profiles associated with the users. The one or more user profiles may include indications of one or more affiliations within the online game. The one or more affiliations may comprise discrete groups of users, wherein the users have a relationship having a functional significance within the online game that has an impact on game play. The one or more user profiles may include indications of inventory information for the users. For example, the profiles of users may include a first user profile for a first user having an indication that the user is associated with a first affiliation and inventory information for the first user, and a second user profile for a second user having an indication that the second user is associated with the first affiliation and inventory information for the second user. The first and second users may be associated with the same affiliation. The first and second users may have a relationship that has a functional significance impacting game play.

The user component 110 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The relationship component 112 may be configured to manage one or more affiliations within the online game. A given affiliation within the online game may comprise a discrete group of users with a relationship having a functional significance within the online game. The relationship having a functional significance in the online game may impact on game play for the users. The affiliations may comprise a first affiliation within a first online game between a group of users including the first user and the second user. The relationship having a functional significance may include one or more of a leadership role, a controller role, a mentorship role and/or an administrator role.

The relationship component 112 may be configured to establish relationships between users within the virtual space. Such relationships may include one or more of affiliations, friendships, guilds (with guild-mates), alliances, connections, followers, comrades, teams, cooperatives, and/or other relationships. The relationship component 112 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space does not have a functional result.

The system may further comprise an interaction component. The interaction component may be configured to monitor interactions of the users with the virtual space and/or each other within the virtual space. This may include monitoring, for a given user, one or more of times at which the given user is logged in to the virtual space; areas of the virtual space the given user views or interacts with or in; other users the given user interacts with; the nature and/or content of interactions of the given user with other users; activities participated in within the virtual space; level, powers, or skill attained in the virtual space; inventory items obtained in the virtual space; and/or other interactions of the given user with the virtual space and/or other users. Some or all of the information generated by the interaction component in monitoring the interactions of the users may be stored in the user profiles managed by user component 110.

At a given time, the interaction component may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or taking some other action indicating ongoing and contemporaneous engagement with the virtual space.

The interaction component may be configured to determine, for individual users, an activity metric that indicates an activity level within the virtual space. The activity metric may be determined based on one or more of log-in frequency, amount of time logged in to the virtual space within a rolling time period (e.g., over the last day, week, month, or other rolling time period), average amount of time logged in to the virtual space over some length of time (e.g., per day, per week, and/or other length of time), average log-in session time over a rolling time period, number of inter-user communications over a length of time, number of inter-user communications per log-in, number of relationships with other users in the virtual space, number of new relationships with other users in the virtual space within a rolling time period, amount of real world money spent in the virtual space, and/or other activity parameters.

Figure 2:
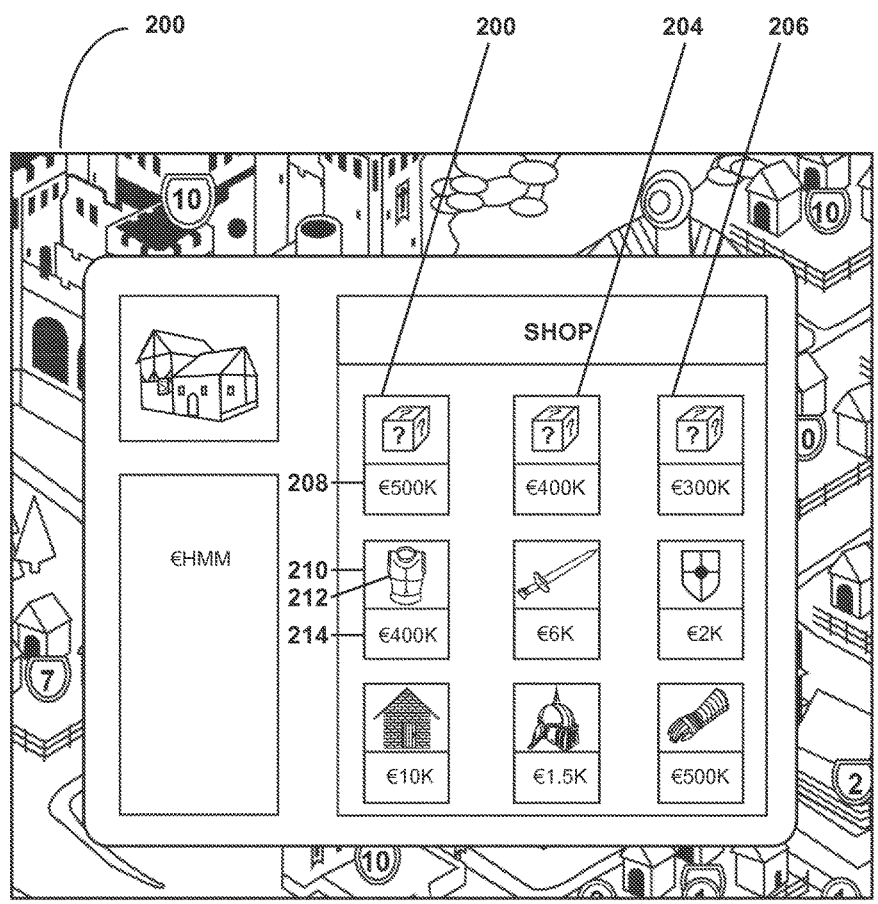
FIG. 2 illustrates an interface for providing offers to users that have an affiliation for the purchase of virtual containers, in accordance with one or more implementations.

FIG. 2 illustrates an interface 200 for providing offers to users having an affiliation for the purchase of virtual containers 202, 204, and/or 206, in accordance with one or more implementations. The virtual shop component 114 may be configured to present, through a store interface, offers to sell container instances of virtual containers 202, 204, and/or 206, the offers including a first offer to sell an instance of a first virtual container 202 at a first price 208. The virtual containers may be associated with sets of potential awards. The first virtual container 202 may be associated with a first set of potential awards and/or any other awards. The first set of potential awards may include a first potential award, a second potential award, and/or any other potential awards. In some implementations, the "inventory" of virtual items may include virtual containers. As an example, virtual containers may include boxes, chests, bundles, packages, or other awards that at least "appear" to store or contain one or more virtual awards. Activation of a container instance of a virtual container may include "opening," "unwrapping," "turning on," or other actions performed with respect to the container instance by a user to obtain, or for a chance to obtain, one or more virtual awards. Potential awards may be any award and/or virtual item the user has the probability of acquiring through a virtual container.

The virtual shop component 114 may be configured to present a store interface 200 to the users. The store interface 200 may present offers 210 to users to buy item instances of virtual items 212. The virtual items 212 may include a first virtual item and/or any other item. A virtual item 212 may be an item that can be used in the game instance by the user. For example, a virtual item 212 may be used to assist a player's character, and/or in other ways. Examples of virtual items 212 include, but are not limited to, resources, currency, valuables (money, valuable metals or gems, etc.), weapons, spell components, defense components, armor, mounts, pets, attire, power ups, and/or other items.

The virtual shop component 114 may be configured to effectuate presentation to the users of offers to purchase resources. The offers 210 may include a first offer for the first user to purchase a first set of one or more virtual items 212. The virtual items 212 may include a virtual good, a virtual currency, and/or other virtual items as described above. For example, the virtual shop component 114 may be configured such that the offers 210 presented to the first user may be restricted to offers having prices 214 in a first price range. The first price range may be determined based on the user metric for the first user, and/or the user metric for other users. The virtual shop component 114 may be configured such that the first price range may change as participation by the first user in the game causes the user metric for the first user to change. The virtual shop component 114 may be configured such that the first price range may be bounded by one or more both of a minimum value and/or a maximum value. The virtual shop component 114 may be configured such that the offers having prices below the minimum value may not be available for purchase by the first user. The virtual shop component 114 may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experiences with the pricing of in-game goods may be associated with their progress in the game. In some implementations, the higher the level of the player, the lower the in-game goods may cost. Depending on the level of the player, the goods available to the player may change. Overall, as the player advances in the game, new items may be unlocked to the player for purchase. Goods previously provided to the player for purchase may or may not be accessible to the player depending on the player's level.

The probability component 116 may be configured to obtain sets of probabilities associated with the sets of potential awards for the container instances of the virtual containers purchased by the users. The probability component 116 may obtain a first probability set for the first set of potential awards for a first container instance of the first virtual container purchased by a first user and/or any other user. The probability component 116 may obtain a second probability set for the second set of potential awards for the first container instance purchased by the first user and/or any other user.

The probability component 116 may be further configured such that obtaining the probabilities for the first set of potential awards for the first container instance may include adjusting the probabilities based on past distributions through the first container instance. Responsive to an item instance of the first potential item being distributed through the first container instance to the first user, the probability for the second potential item for the first container instance may be adjusted based on a perceived value of individual virtual items in the first set of potential awards and/or any other item.

The probability component 116 may be configured such that the perceived value of the individual virtual items in the first set of potential awards is determined based on a cost of the individual virtual items, the rareness of the individual virtual items, and/or a utility of the individual virtual items. The probability component 116 may be configured to adjust the probabilities for the sets of probabilities in the first set of potential awards to enhance the likelihood that an aggregate value of the items distributed by the first container instance may surpass a minimum aggregate value and/or any other value. The probability component 116 may be configured such that the minimum aggregate value may be determined based on the first price, and/or the minimum aggregate value may be the first price.

The probability component 116 may be configured such that, responsive to the value of the first potential award being high in relation to the values of the other potential awards in the first set of potential awards, responsive to the value of the second potential award being low in relation to the values of the other potential awards in the first set of potential awards, and further responsive to distribution of an item instance of the second potential award through the first container instance, the probability for the first potential award may be adjusted higher to enhance the likelihood that the first container instance may distribute an item instance of the first potential award to enhance an aggregate value of the items distributed by the first container instance and/or any other container instance.

The probability component 116 may be configured to adjust probabilities for the awards in the first set of potential awards to enhance the likelihood that an aggregate value of the awards distributed by the first container instance may not surpass a maximum aggregate value and/or any other value. The probability component 116 may be configured such that the maximum aggregate value is determined based on the first price and/or any other price.

In some implementations, the probability of obtaining a certain cost (e.g., more expensive item vs. less expensive item) of the second item in the box through the Nth item in the box may depend on the overall cost of the box and the value of the first item in the box.

Games allow users to pay to receive mystery boxes for in-game use. The mystery boxes may have multiple virtual items that are worth different amounts. Sometimes a user will receive a mystery box with multiple items that has an overall value less than what the user paid. If this continues to occur, the user will become frustrated and stop paying to purchase mystery boxes.

With any chance-based system, when a user purchases a mystery box, some items may be more valuable and some less valuable. When a user continually purchases a mystery box and continues to receive less valuable items, a user may be discouraged from continuing to purchase mystery boxes.

In some implementations, the probability of obtaining a particular value of the second item through Nth item may be dynamically weighted based on the value of the first item.

For example, if the user pays $1.00 for the mystery box and the first prize by chance is only worth $0.10, there may be a higher probability that the combined value of the subsequent items (e.g., second, third, fourth, etc.) will be worth at least $0.90. The items that arise subsequently may be either higher or lower based on the cost of the box and the value of the first item. The values of the subsequent items may be dynamically changed based on the value of the first item.

In some implementations, the system could provide for allowing the user the ability to swap out at least one item in the mystery box for a second random chance of obtaining something better. The second chance may be randomly determined and may provide a more valuable item or a less valuable item.

The virtual container component 118 may be configured to receive activation requests from users for the offered container instances of the virtual containers, such that a first activation request for the first virtual container is received from the first user. The virtual container component 118 may be configured to determine, using the obtained set of probabilities for the activated virtual container and responsive to the activation request, an award from the set of potential awards associated with the activated virtual container provided to the users. For example, a first award from the first set of potential awards of the first virtual container may be determined for distribution to the first user based on the first set of probabilities.

In some implementations the virtual containers may be placed into a user's inventory upon purchase by the user of the virtual container from the virtual shop. For example, in response to the first user accepting the first offer for the first virtual container, the inventory information for the first user may be updated to indicate that the first user has the first virtual container in their inventory. The user may activate the virtual container from the inventory associated with the user. The user may have the virtual container in the inventory for a period of time prior to the first user activating the virtual container. By delaying the activation of the virtual container, the user may choose to activate the virtual container at a time when the probability for obtaining a particular potential award from the set of potential awards associated with the virtual container is at its greatest.

The determination of an award from the set of potential awards may be made based on the probabilities obtained by the probability component 116, such that the virtual container component 118 may determine which potential award in the first set of potential awards may be distributed to the first user through the first container instance in response to an activation request from the first user for the first container instance and/or any other container instance. The determination of potential awards in the first set of potential awards may be based on the probabilities for the potential awards in the first set of potential awards for the first container instance obtained by the probability module and/or any other module.

The distribution component 120 may be configured to distribute the award to the users, in response to determining the award to provide to the users from the activated virtual container, such that, in response to determining the first award from the first virtual container activated by the first user to be distributed to the users, the first award is distributed to the first user, and in response to the first award being distributed to the first user, a first benefit is provided to the users with the first affiliation, such that a benefit is provided to the second user.

The benefits provided to the affiliation members may impact game play of the affiliation members, such that the affiliation members may have an advantage in the game over users who are not members of the affiliation and who do not have the benefits. Such benefits may include, but are not limited to, increased resource gathering abilities, increased resource capabilities, increased armed forces capabilities, increased purchasing power, increased discounts when purchasing in game items, decreased time between turns, upgrades and/or other time-based aspects of a game, and/or other benefits in the game. Some benefits may relate to the manner in which games are provided. Benefits may provide increased quality of service for the user when playing the game, increased server processing resources for the users, prioritized server resources for the users, and/or other priorities and benefits.

The awards provided to users of the game who activate the virtual containers may provide benefits to those users. The potential awards may provide one or more benefits to the users in the game, such that the first potential award provided to the first user may provide one or more first benefits to the first user in the game. The first benefit may be a virtual item having a value within the game. Such virtual items may include functional and non-functional virtual items. Functional virtual items may be used by players in the game to provide a benefit in the game otherwise not enjoyed by users. Non-functional virtual items may include indications of an award and/or achievement within the game, such as a trophy or symbolic indication of the achievement.

The perceived value of the first benefit associated with the first award to the first user may be greater than the perceived value of the benefit provided to the affiliation members. By providing a benefit having a higher perceived value to the first user who activated the virtual container, than the benefit provided to the other affiliation members, the first user maintains their ranking and status within the game. By providing an award to the first user that has a higher perceived value, compared to the benefit provided to the other users of the affiliation, such as the second user, the first user maintains and/or increases their status with respect to the other members of the affiliation. It has been found that while high spend users are attracted to the prospect of helping their fellow affiliation members, they also are attracted to maintaining or increasing their status with respect to those members. Providing a benefit to the high spend users to increase their status, while also allowing the high spend users to provide a benefit to their fellow affiliation members, has been found to be highly attractive to the high spend users, thereby incentivizing the users to engage further with the game and/or increase their in-game purchases.

Offers for virtual containers associated with potential awards may be awarded to users based on one or more parameters. The offers may be offered once the user has accomplished a certain achievement within the game. Achievements may include, but may not be limited to, completing a certain objective within the game and/or obtaining a certain amount of virtual items, such as resources, troops, armor, buildings, etc. within the game. Other achievements may include accumulating a certain amount of virtual currency, experience points, a certain score, or other measures of success within the game. In this manner, offers for virtual containers associated with potential awards may be provided to users having a certain status within the game, such as only those users who have a relatively high status compared to other users have the opportunity to obtain such virtual containers. Limiting the users who may be offered the virtual containers may incentivize players to attain and/or maintain that status in the game, increasing user engagement and user spend in the game. In other implementations, offers are not limited to players having a certain status in the game.

Figure 3:
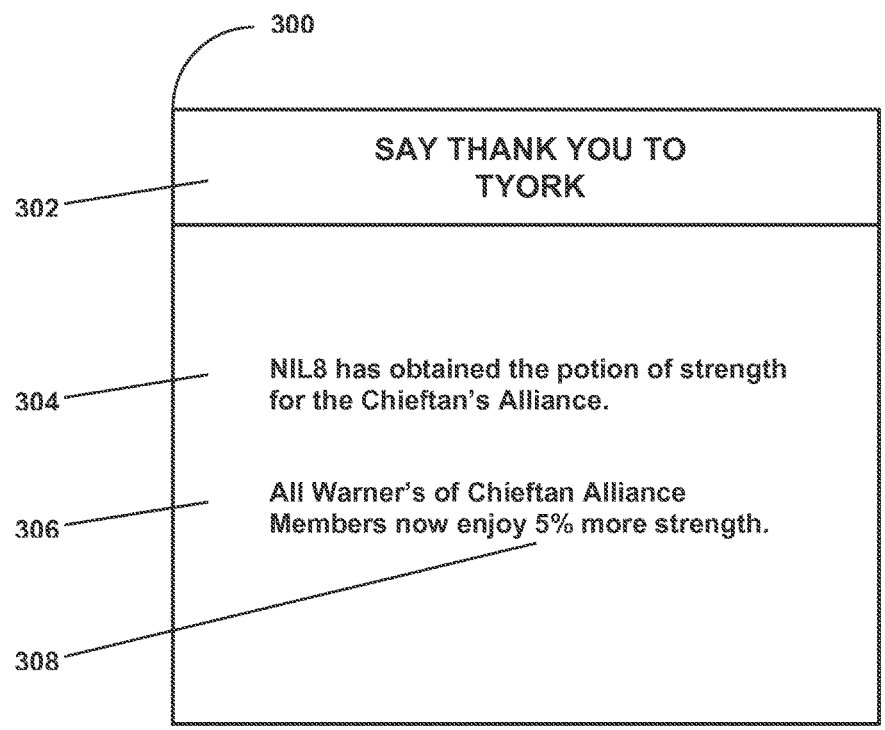
FIG. 3 illustrates an interface for providing notifications to members of an affiliation who have been benefited, in accordance with one or more implementations.

FIG. 3 illustrates an interface 300 for providing notifications 302 to members of an affiliation who have been benefited, in accordance with one or more implementations. The notification component 122 may be configured to provide a notification to the members of the first affiliation indicating that the first user has activated the first virtual container and the affiliation members have received a benefit. For example, the second user may be provided a notification 302 having an indication 304 that the first user has activated the first virtual container causing the second user to receive a benefit 306. The notification 302 may provide an indication 308 of the type of benefit received by the second user in response to the first user activating the first virtual container. The benefit may be associated with the first award provided to the first user. The benefit may be a randomly-selected benefit from a plurality of benefits to provide to the members of the affiliation of the first user. The benefit may have a perceived value within the game. The value of the benefit, relative to others from the plurality of benefits, may be proportionate to the value of the first item, relative to the others from the plurality of items, associated with the mystery box. For example, if the first user receives a relatively valuable item in response to activating the mystery box, the other members of the first affiliation may receive a relatively valuable benefit. Conversely, if the first user receives a relatively invaluable item in response to activating the virtual container, the other members of the first affiliation may receive a relatively invaluable benefit.

By providing a notification 302 to affiliation members of the deeds of the first user, the first user received increased social status within the affiliation. Affiliation members may reach out to the first user to thank the first user for their generosity in providing a benefit to the other affiliation members. The notification component 122 may be configured to facilitate notification to the first user that the affiliation members have been informed of and are grateful for the first user providing them a benefit. Such mechanisms in the game effectively stroke the ego of the first player, increasing the likelihood that the first player will continue to purchase virtual containers and, therefore, increase the likelihood that the first user will spend money in the virtual game.

Figure 4:
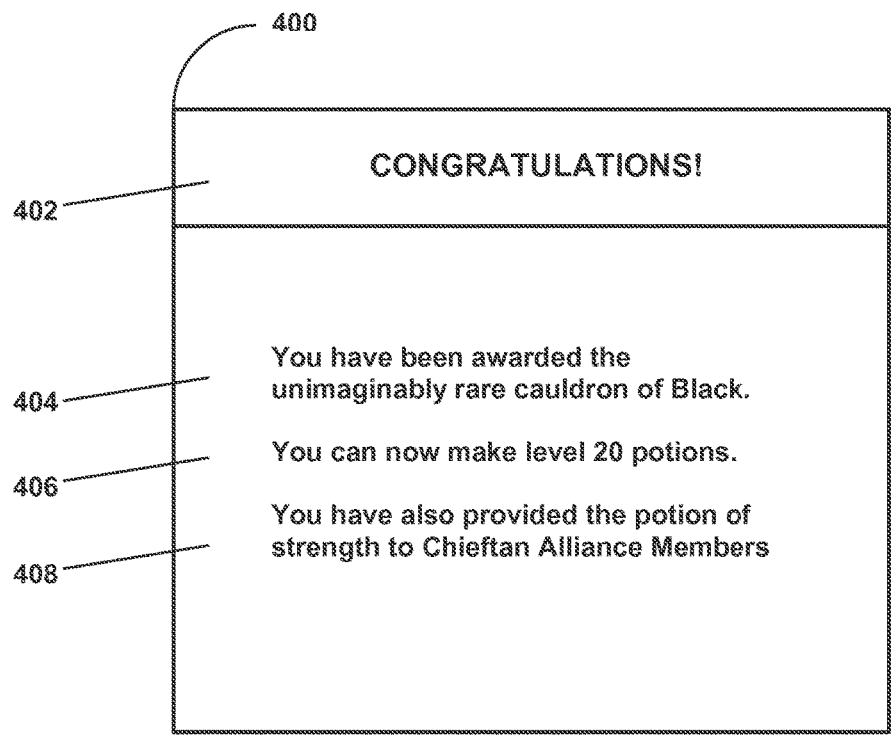
FIG. 4 illustrates an interface for providing notifications to users who have benefited other members of their affiliation, in accordance with one or more implementations; and, FIG. 5 illustrates a method for providing awards to players of a game, in accordance with one or more implementations.

FIG. 4 illustrates an interface 400 for providing notifications 402 to users who have benefited other members of their affiliation, in accordance with one or more implementations. The notification component 122 may be configured to facilitate the presentation of notifications 402 to users who have activated virtual containers. For example, the notification component 122 may be configured to facilitate the presentation of a notification 402 congratulating the first user for activating a virtual container. The notification 402 may include an indication 404 of the virtual item and/or award received by the first user for activating the virtual container. The notification 402 may include an indication 406 of a benefit provided by the virtual item and/or award received by the first user for activating the virtual container. The notification 402 may include an indication 408 of one or more benefits provided to members of the affiliation associated with the first user, in response to the first user activating the first virtual container.

The notification component 122 may be configured to provide notifications to users of the game indicating offers to provide virtual containers. The notifications may include an indication of the one or more potential benefits provided by the sets of potential awards, such that the first user may receive a first notification of a first offer to provide a first virtual container having a first set of potential awards, wherein the first notification includes an indication of a first potential in-game benefit to the first user and a second potential in-game benefit to the second user. Users, viewing notifications, may be provided indications of the type of benefit they may potentially receive from accepting the offer and/or activating the virtual container, and may also be provided indications of the type of benefit that may be potentially received by the other members of their affiliation.

The server 102, client computing platforms 104, and/or external resources 124 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which servers 102, client computing platforms 104, and/or external resources 124 may be operatively linked via some other communication media.

A given client computing platform 104 may include one or more processors configured to execute computer program components. The computer program components may be configured to enable an expert or user associated with the given client computing platform 104 to interface with the system 100 and/or external resources 124 and/or to provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 124 may include sources of information, hosts and/or providers of virtual environments outside of the system 100, external entities participating with the system 100, and/or other resources. In some implementations, some or all of the functionality attributed herein to external resources 124 may be provided by resources included in the system 100.

The server 102 may include electronic storage 126, one or more processors 128, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to the server 102. For example, the server 102 may be implemented by a cloud of computing platforms operating together as the server 102.

The electronic storage 126 may include electronic storage media that electronically stores information. The electronic storage media of the electronic storage 126 may include one or both of system storage that is provided integrally (i.e., substantially non-removable) with the server 102 and/or removable storage that is removably connectable to the server 102 via, for example, a port (e.g., a USB port, a firewire port, etc.) or a drive (e.g., a disk drive, etc.). The electronic storage 126 may include one or more of optically-readable storage media (e.g., optical disks, etc.), magnetically-readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically-readable storage media. The electronic storage 126 may include one or more virtual storage resources (e.g., cloud storage, a virtual private network, and/or other virtual storage resources). The electronic storage 126 may store software algorithms, information determined by the processor 128, information received from the server 102, information received from client computing platforms 104, and/or other information that enables the server 102 to function as described herein.

Processor(s) 128 may be configured to provide information processing capabilities in the server 102. As such, the processor 128 may include one or more of a digital processor, an analog processor, a digital circuit designed to process information, an analog circuit designed to process information, a state machine, and/or other mechanisms for electronically processing information. Although the processor 128 is shown in FIG. 1 as a single entity, this is for illustrative purposes only. In some implementations, the processor 128 may include a plurality of processing units. These processing units may be physically located within the same device or the processor 128 may represent the processing functionality of a plurality of devices operating in coordination. The processor 128 may be configured to execute components 108, 110, 112, 114, 116, 118, 120, 122, and/or other components. The processor 128 may be configured to execute components 108, 110, 112, 114, 116, 118, 120, 122, and/or other components by: software; hardware; firmware; some combination of software, hardware, and/or firmware; and/or other mechanisms for configuring processing capabilities on processor 128.

It should be appreciated that although components 108, 110, 112, 114, 116, 118, 120, and/or 122, are illustrated in FIG. 1 as being co-located within a single processing unit, in implementations in which the processor 128 includes multiple processing units, one or more of components 108, 110, 112, 114, 116, 118, 120, 122, and/or other components may be located remotely from the other components. The description of the functionality provided by the different components 108, 110, 112, 114, 116, 118, 120, 122, and/or other components described herein is for illustrative purposes and is not intended to be limiting, as any of components 108, 110, 112, 114, 116, 118, 120, 122, and/or other components may provide more or less functionality than is described. For example, one or more of components 108, 110, 112, 114, 116, 118, 120, 122, and/or other components may be eliminated and some or all of its functionality may be provided by other ones of components 108, 110, 112, 114, 116, 118, 120, 122, and/or other components. As another example, the processor 128 may be configured to execute one or more additional components that may perform some or all of the functionality attributed below to one of components 108, 110, 112, 114, 116, 118, 120, 122, and/or other components.

Figure 5:
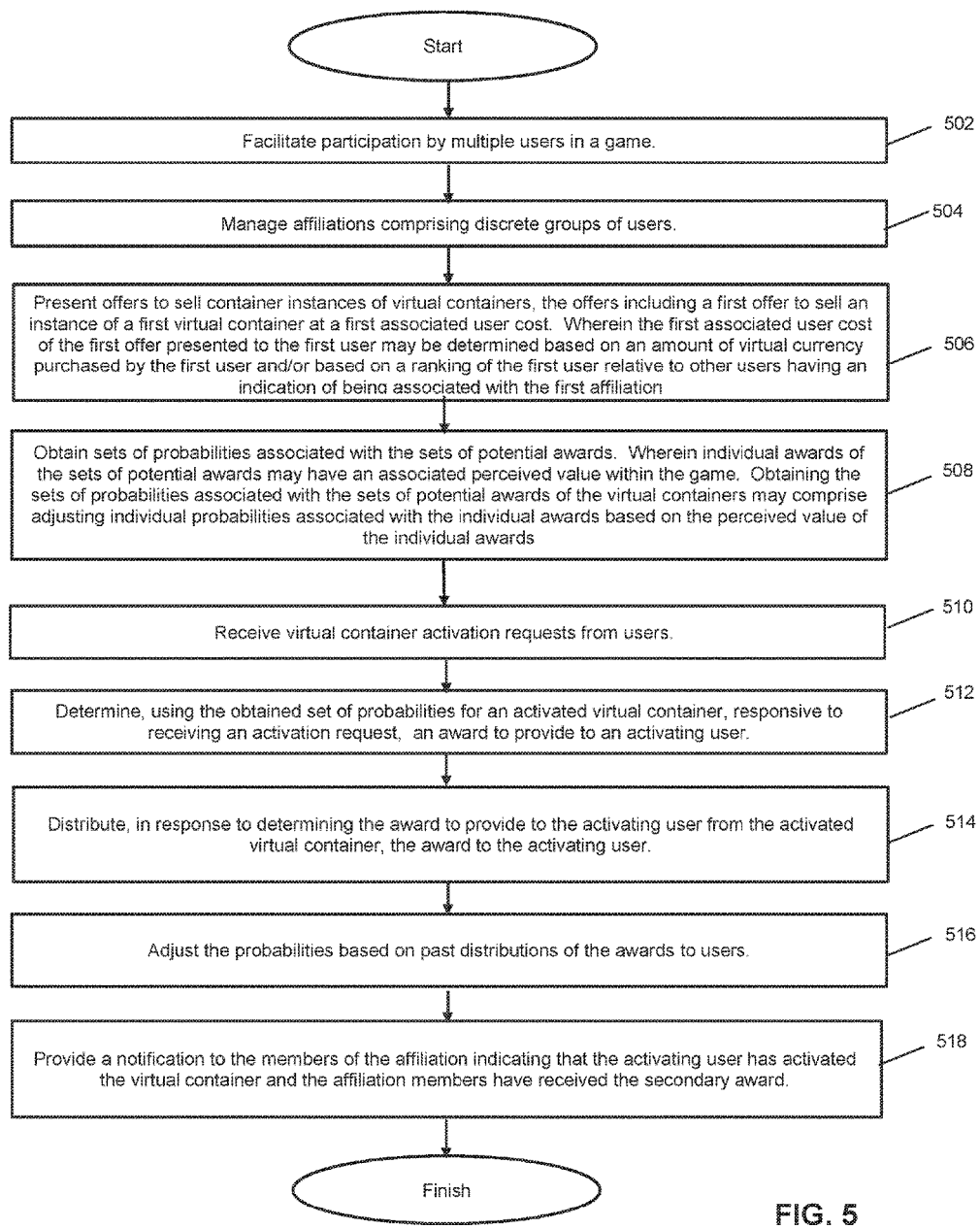

FIG. 5 illustrates a method 500 for providing virtual items to users of a game. The operations of the method 500 presented below are intended to be illustrative. In some embodiments, the method 500 may be accomplished with one or more additional operations not described and/or without one or more of the operations discussed. Additionally, the order in which the operations of the method 500 are illustrated in FIG. 5 and described below is not intended to be limiting.

In some embodiments, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of the method 500.

At an operation 502, participation by multiple users in a game may be facilitated through client computing platforms associated with the users. The actions performed at operation 502 may be performed by a space component, such as the space component 108 illustrated in FIG. 1, in accordance with one or more implementations.

At an operation 504, one or more user profiles associated with the users may be managed. The one or more user profiles may include: (i) indications of one or more affiliations within the online game including a discrete group of users with a relationship having a functional significance within the online game that has an impact on game play; and, (ii) inventory information for the users. The profiles of users may include a first user profile for a first user having an indication that the user is associated with a first affiliation and inventory information for the first user, and a second user profile for a second user having an indication that the second user is associated with the first affiliation and inventory information for the second user. The actions performed at operation 504 may be performed by a user component, such as the user component 110 illustrated in FIG. 1, in accordance with one or more implementations.

At an operation 506, offers to sell container instances of virtual containers may be presented to users. The offers may include a first offer to sell an instance of a first virtual container at a first associated user cost, the virtual containers being associated with sets of potential awards, such that the first virtual container is associated with a first set of potential awards including a first potential award. The actions performed at operation 506 may be performed by a virtual shop component, such as the virtual shop component 114 illustrated in FIG. 1, in accordance with one or more implementations.

At an operation 508, sets of probabilities associated with the sets of potential awards of the virtual containers may be obtained, such that a first probability set is obtained for the first set of potential awards of the first virtual container. The actions performed at operation 508 may be performed by a probability component, such as the probability component 116 illustrated in FIG. 1, in accordance with one or more implementations.

At an operation 510, activation requests may be received from users for the offered container instances of the virtual containers, such that a first activation request for the first virtual container may be received from the first user. The actions performed at operation 510 may be performed by a virtual container component, such as the virtual container component 118 illustrated in FIG. 1, in accordance with one or more implementations.

At an operation 512, responsive to the activation request received at operation 510, an award from the set of potential awards associated with the activated virtual container to be provided to the users may be determined. The determination of the award may be based on the obtained set of probabilities. For example, a first award from the first set of potential awards of the first virtual container may be determined for distribution to the first user based on the first set of probabilities. The actions performed at operation 512 may be performed by a probability component, such as the probability component 116 illustrated in FIG. 1, in accordance with one or more implementations.

At an operation 514, in response to determining the award to be provided to the users from the activated virtual container at operation 512, the award to the users may be determined. For example, in response to determining the first award from the first virtual container activated by the first user to be distributed to the users, the first award may be distributed to the first user. In response to the first award being distributed to the first user, a benefit may be provided to the users associated with the first affiliation, such that the second user is provided a benefit. The actions performed at operation 514 may be performed by a distribution component, such as the distribution component 120 illustrated in FIG. 1, in accordance with one or more implementations.

At an operation 516, the sets of probabilities associated with the sets of potential awards of the virtual containers may be adjusted based on past distributions of the awards to users. For example, the probability associated with the first award may be adjusted based on the past distributions of the first award. The actions performed at operation 516 may be performed by a probability component, such as the probability component 116 illustrated in FIG. 1, in accordance with one or more implementations.

At an operation 518, a notification may be provided to the members of the first affiliation indicating that the first user has activated the first virtual container and the affiliation members have received a benefit. For example, the second user may be provided a notification indicating that the first user has activated the first virtual container causing the second user to receive a benefit. The actions performed at operation 518 may be performed by a notification component, such as the notification component 122 illustrated in FIG. 1, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing awards for players of an online game, the system comprising:
one or more physical computer processors configured by machine-readable instructions to:
facilitate participation by multiple users in the online game through client computing platforms associated with the users;
manage user profiles associated with the users, wherein the user profiles include:
indications of one or more affiliations within the online game comprising a discrete group of the users with a relationship having a functional significance within the online game that has an impact on game play;

such that the profiles of the users include a first user profile for a first user having an indication that the first user is associated with a first affiliation and a second user profile for a second user having an indication that the second user is associated with the first affiliation;

present, through a store interface, offers to sell container instances of virtual containers, the offers including a first offer to sell an instance of a first virtual container at a first associated user cost, the virtual containers being associated with sets of potential awards which are associated with sets of probabilities, such that the first virtual container is associated with a first set of potential awards including a first potential award, the first set of potential awards being associated with a first set of probabilities;

receive activation requests from users for the offered container instances of the virtual containers, such that a first activation request for the first virtual container is received from the first user;

determine, using the set of probabilities associated with an activated virtual container and responsive to receiving an activation request, an award from the set of potential awards associated with the activated virtual container to provide to an activating user, such that a first award from the first set of potential awards of the first virtual container is determined for distribution to the first user based on the first set of probabilities; and, distribute, in response to determining the award to provide to the activating user from the activated virtual container, the award to the activating user and one or more benefits for the users associated with an affiliation of the activating user, such that in response to determining the first award from the first virtual container activated by the first user to be distributed to the first user, the first award is distributed to the first user, and, responsive to the first award being distributed to the first user, one or more first benefits are provided for the users associated with the first affiliation, such that one or more of the first benefits is provided for the second user.

2. The system of claim 1, wherein the one or more processors are further configured by machine-readable instructions to adjust the probabilities of the sets of probabilities based on past distributions of the awards to the users, such that a probability associated with the first award is adjusted based on past distributions of the first award.

3. The system of claim 1, wherein individual awards of the sets of potential awards have an associated perceived value within the game, and wherein the one or more processors are further configured by machine-readable instructions to adjust individual probabilities associated with the individual awards based on the perceived value of the individual awards, such that a first probability associated with a first potential award is adjusted based on a first perceived value of the first potential award in the game.

4. The system of claim 3, wherein the first perceived value of the first potential award in the game is based on an abundance of the first potential award in the game.

5. The system of claim 1, wherein the one or more physical processors are configured by machine-readable instructions to provide a notification to members of the first affiliation indicating that the first user has activated the first virtual container and the members of the first affiliation have received one or more of the first benefits, such that the second user is provided the notification having an indication that the first user has activated the first virtual container causing the second user to receive one or more of the first benefits.

6. The system of claim 1, wherein the potential awards provide one or more of the benefits for the users in the game, such that the first potential award provided to the first user provides a first benefit for the first user in the game, and the first potential award provides a second benefit for the second user.

7. The system of claim 6, wherein the first benefit provided by the first potential award to the first user has a perceived value in the game greater than the second benefit provided for the second user.

8. The system of claim 1, wherein the one or more processors are configured by machine-readable instructions to provide notifications to the users of the game of the offers to sell container instances of virtual containers, wherein the notifications include an indication of a one or more potential benefits provided by the sets of potential awards, such that the first user receives a first notification of a first offer to provide the first virtual container having the first set of potential awards, wherein the first notification includes an indication of a first potential in-game benefit for the first user and a second potential in-game benefit for the second user.

9. The system of claim 1, wherein the one or more processors are configured by machine-readable instructions to determine the first associated user cost of the first offer presented to the first user based on an amount of virtual currency purchased by the first user.

10. The system of claim 1, wherein the one or more physical processors are configured by machine-readable instructions to determine the first associated user cost of the first offer presented to the first user of the game based on a ranking of the first user relative to other users having an indication of being associated with the first affiliation.

11. A method for providing awards for players of an online game, the method to be performed on one or more physical computer processors, the method comprising:

facilitating participation by multiple users in the online game through client computing platforms associated with the users;

managing one or more user profiles associated with the users, wherein the one or more user profiles include:

indications of one or more affiliations within the online game comprising a discrete group of the users with a relationship having a functional significance within the online game that has an impact on game play;

such that the profiles of the users include a first user profile for a first user having an indication that the first user is associated with a first affiliation and a second user profile for a second user having an indication that the second user is associated with the first affiliation;

presenting, through a store interface, offers to sell container instances of virtual containers, the offers including a first offer to sell an instance of a first virtual container at a first associated user cost, the virtual containers being associated with sets of potential awards which are associated with sets of probabilities, such that the first virtual container is associated with a first set of potential awards including a first potential award, the first set of potential awards being associated with a first set of probabilities;

receiving activation requests from users for the offered container instances of the virtual containers, such that a first activation request for the first virtual container is received from the first user;

determining, using the set of probabilities associated with an activated virtual container and responsive to receiving an activation request, an award from the set of potential awards associated with the activated virtual container to provide to an activating user, such that a first award from the first set of potential awards of the first virtual container is determined for distribution to the first user based on the first set of probabilities; and, distributing, in response to determining the award to provide to an activating user from the activated virtual container, the award to the activating user, such that, in response to determining the first award from the first virtual container activated by the first user to be distributed to the first user, the first award is distributed to the first user, and, in response to the first award being distributed to the first user, one or more first benefits are provided for the users associated with the first affiliation, such that one or more of the first benefits is provided for the second user.

12. The method of claim 11, further comprising adjusting the probabilities of the sets of probabilities based on past distributions of the awards to the users, such that a probability associated with the first award is adjusted based on the past distributions of the first award.

13. The method of claim 11, wherein the individual awards of the sets of potential awards have an associated perceived value within the game, and wherein the method further comprises adjusting individual probabilities associated with the individual awards based on the perceived value of the individual awards, such that a first probability associated with a first potential award is adjusted based on a first perceived value of the first potential award in the game.

14. The method of claim 13, wherein the first perceived value of the first potential award in the game is based on an abundance of the first potential award in the game.

15. The method of claim 11, further comprising providing a notification to members of the first affiliation indicating that the first user has activated the first virtual container and the members of the first affiliation have received one or more of the first benefits, such that the second user is provided the notification having an indication that the first user has activated the first virtual container causing the second user to receive one or more of the first benefits.

16. The method of claim 11, wherein the potential awards provide one or more of the benefits for the users in the game, such that the first potential award provided to the first user provides a first benefit for the first user in the game, and the first potential award provides a second benefit for the second user.

17. The method of claim 16, wherein the first benefit provided by the first potential award for the first user has a perceived value in the game greater than the second benefit provided for the second user.

18. The method of claim 11, further comprising providing notifications to users of the game of the offers to sell container instances of virtual containers, wherein the notifications include an indication of a the one or more potential benefits provided by the sets of potential awards, such that the first user receives a first notification of a first offer to provide the first virtual container having the first set of potential awards, wherein the first notification includes an indication of a first potential in-game benefit for the first user and a second potential in-game benefit for the second user.

19. The method of claim 11, wherein the first associated user cost of the first offer presented to the first user is determined based on an amount of virtual currency purchased by the first user.

20. The method of claim 11, wherein the first associated user cost of the first offer presented to the first user of the game is determined based on a ranking of the first user relative to other users having an indication of being associated with the first affiliation.

* * * * *